(12) United States Patent
Hadley et al.

(10) Patent No.: US 11,124,109 B2
(45) Date of Patent: Sep. 21, 2021

(54) BLADE SUPPORT APPARATUS

(71) Applicants: Laurie J. Hadley, Clarksville, TN (US); William Wade Hadley, Clarksville, TN (US); Charles Lee Phy, McEwen, TN (US)

(72) Inventors: Laurie J. Hadley, Clarksville, TN (US); William Wade Hadley, Clarksville, TN (US); Charles Lee Phy, McEwen, TN (US)

( * ) Notice: Subject to any disclaimer, the term of this patent is extended or adjusted under 35 U.S.C. 154(b) by 111 days.

(21) Appl. No.: 16/584,881

(22) Filed: Sep. 26, 2019

(65) Prior Publication Data

US 2020/0094993 A1     Mar. 26, 2020

Related U.S. Application Data

(60) Provisional application No. 62/736,731, filed on Sep. 26, 2018.

(51) Int. Cl.
*B60P 3/40* (2006.01)
*B65D 85/68* (2006.01)
*B60P 7/135* (2006.01)

(52) U.S. Cl.
CPC ............... *B60P 3/40* (2013.01); *B60P 7/135* (2013.01); *B65D 85/68* (2013.01); *B65D 2585/687* (2013.01); *B65D 2585/6882* (2013.01)

(58) Field of Classification Search
CPC ..... B60P 3/40; B60P 3/11; B60P 3/135; B60P 7/12; B60P 7/16; B64C 2025/325; B64C 2201/201; B64F 1/125; B64F 1/14; B64F 5/50

USPC ................................ 410/2, 44, 45, 120
See application file for complete search history.

(56) References Cited

U.S. PATENT DOCUMENTS

| | | | | |
|---|---|---|---|---|
| 1,893,227 A * | 1/1933 | Cohen-Venezian | ....... | B64F 1/22 410/43 |
| 2,725,241 A * | 11/1955 | Leonard, Jr. | .............. | B60P 3/11 410/44 |
| 7,980,522 B2 * | 7/2011 | Anderson | ................. | B25B 5/14 248/316.5 |
| 8,313,272 B2 * | 11/2012 | Koike | ................. | H01M 8/0252 410/44 |
| 2018/0001812 A1 * | 1/2018 | Friemel | .................... | B60P 3/11 |
| 2019/0322206 A1 * | 10/2019 | Lamy | ....................... | B60P 3/11 |

* cited by examiner

*Primary Examiner* — Stephen T Gordon
(74) *Attorney, Agent, or Firm* — Gerald R. Black, Esq.

(57) ABSTRACT

The blade support apparatus relates to capturing and stabilizing airfoils such as helicopter blades to enable ground transport without requiring removal of airfoils or blades with the blade support apparatus and blades in a protective container. The blade support apparatus captures and stabilizes helicopter blades utilizing a support frame with vertical and radial adjustable supports. These supports have contoured padded cradles and means of adjusting the height and angle of the cradles to match the profile being captured. The blade support apparatus enables loading, transport, and unloading of the airfoils for transport in a separate blade container which may either be stand alone or attaches to a helicopter transport apparatus. An alternate embodiment utilizes a support frame which is vertically and radially adjustable. Within the support frame are the same contoured padded swivel cradles which also adjust to the height and angle of the profile being captured.

12 Claims, 17 Drawing Sheets

THE BLADE SUPPORT APPARATUS WITH BLADES REMOVED

THE BLADE SUPPORT APPARATUS - FIRST EMBODIMENT

THE BLADE SUPPORT APPARATUS WITH BLADES STORED

THE BLADE SUPPORT APPARATUS WITH BLADES REMOVED

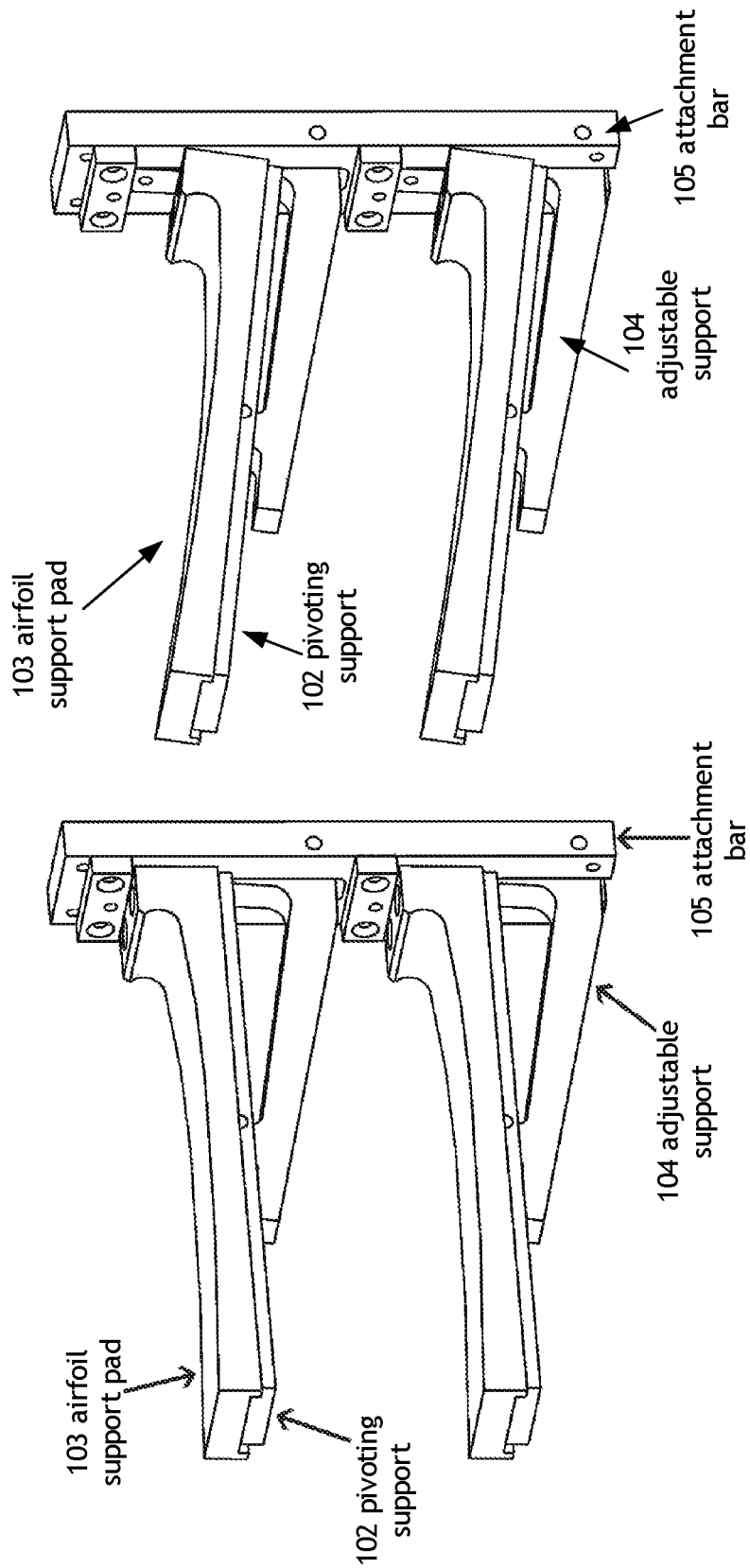

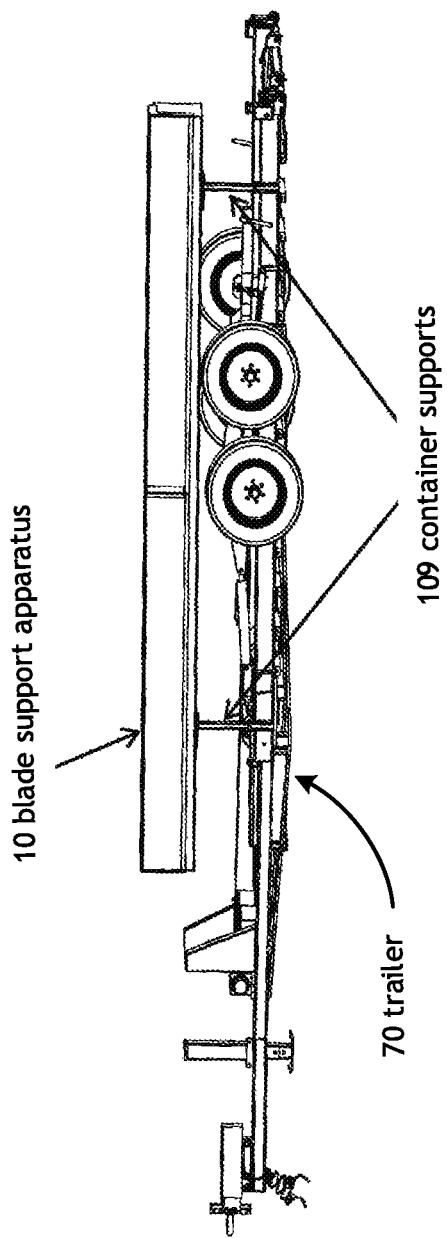

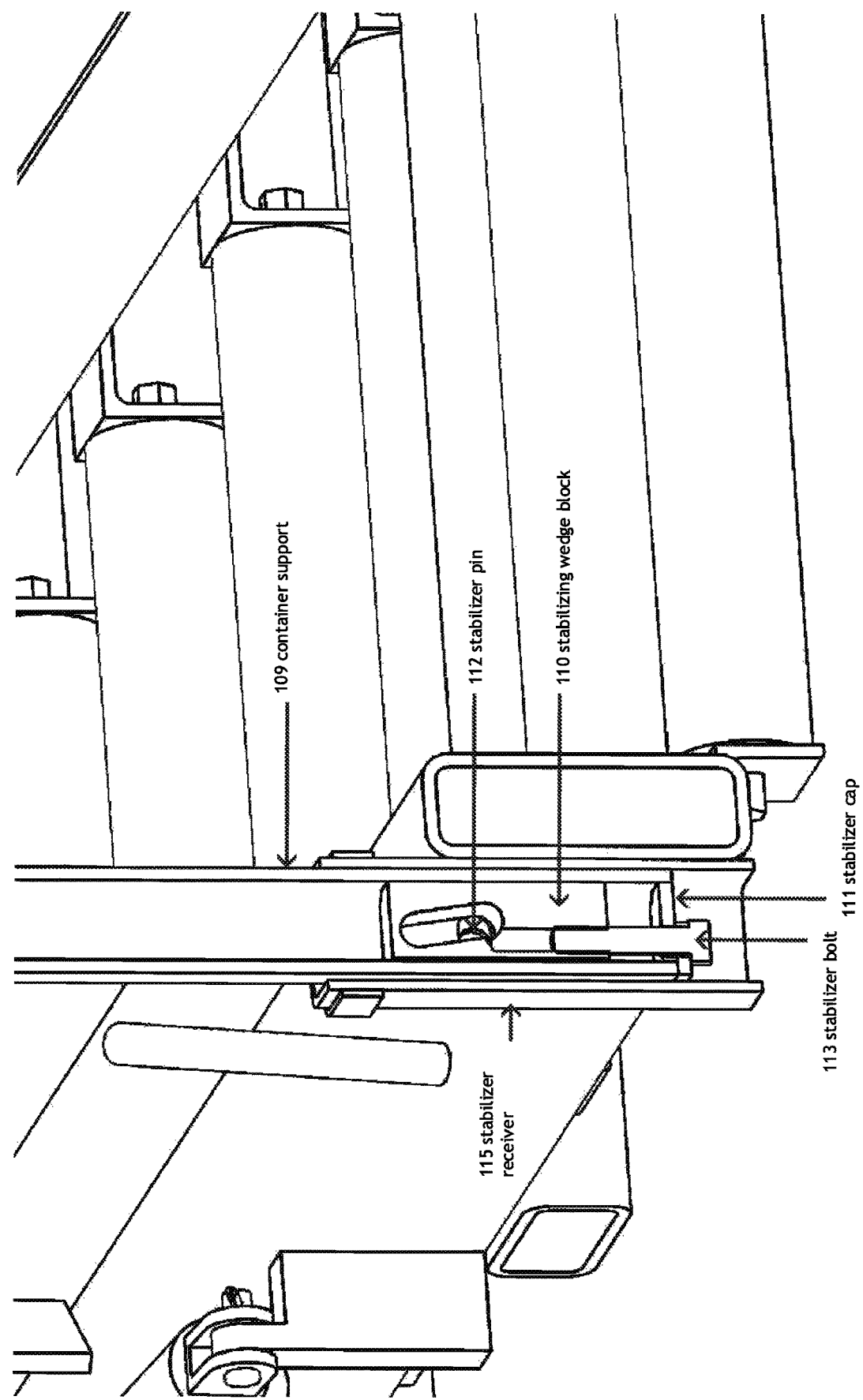

THE BLADE SUPPORT APPARATUS - SECOND EMBODIMENT

THE BLADE SUPPORT APPARATUS - THIRD EMBODIMENT

THE BLADE SUPPORT APPARATUS - FOURTH EMBODIMENT

CAPTURED HELICOPTER BLADES SUPPORTED BY BLADE SUPPORT APPARATUS

BLADE SUPPORT APPARATUS

CROSS-REFERENCE TO RELATED APPLICATIONS

This application is related to and is a Continuation-In-Part Application to U.S. Provisional Application No. 62/736,731, entitled "Blade Support Apparatus" by Laurie J. Hadley et al. filed Sep. 26, 2018.

FIELD OF THE INVENTION

This invention relates to capturing and stabilizing airfoils such as but not restricted to helicopter blades to enable ground transport of aircraft without requiring removal of airfoils ("blades") or with blade support apparatus including blades in a protective box. The first embodiment enables loading, transport, and unloading of airfoils for transport in a separate blade container which may be stand alone or which can attach to a helicopter transport apparatus. A second embodiment of the invention utilizes a support frame which is vertically and radially adjustable. The frame includes the same contoured padded swivel cradles which also adjust to the height and angle of the profile being captured of the helicopter blades.

BACKGROUND INFORMATION

The main rotors of helicopters incorporate a plurality of main rotor blades having large radial dimensions in order to provide the power required to support the flight capabilities of helicopters. These large radial dimensions result in helicopters having structural envelopes that occupy an inordinate amount of space.

Rotorcraft such as, but not limited to, helicopters include a plurality of rotor blades that are used to generate the lift and effectuate the primary flight control of the aircraft. When the rotorcraft is not in use, it can be desired to move or fold the blades of the rotorcraft to a non-flight position. In such a non-flight position, to reduce the footprint of the rotorcraft.

Many manual and automatic blade folding systems have been proposed.

U.S. Pat. No. 7,857,590 (Neal) discloses a folding rotor for a rotorcraft. The folding rotor has a hub bar pivotally connected to a rotor blade. The hub bar is adapted to be connected to the rotorcraft and includes a first locking aperture having a resilient bushing. The rotor blade includes a rotor strap that extends to a mounting element having a second locking aperture. A hinge element connects the hub bar to the mounting element with hinges to enable the rotor blade to pivot with respect to the hub bar between a folded position and an extended position. The first and second locking apertures and the resilient bushing are coaxially aligned when the rotor blade is in the extended position, so that a locking pin may be positioned therethrough to lock the rotor blade in the extended position.

U.S. Pat. No. 6,860,450 (Muylaert, et al.) discloses an apparatus and method for folding helicopter rotor blades for storage and transport. The method comprises providing six helicopters, each helicopter having a fuselage, a main rotor assembly extending out from the fuselage and rotatable about a main rotor axis, and four main rotor blades coupled to the main rotor assembly. The main rotor blades of each helicopter are moveable relative to the main rotor assembly between a deployed position and a stowed position. The deployed position is a position in which the four main rotor blades extend radially from the main rotor. The main rotor blades have a blade rotor diameter of at least forty-seven feet when in the deployed position. The four main rotor blades are coupled to the main rotor assembly when in the stowed position. The method further comprises positioning the six helicopters relative to each other such that all six of the helicopters are simultaneously housed within a parallelepiped region having a height of less than fifteen feet, a width of less than twenty feet, and a length of less than one hundred forty-five feet. The four main rotor blades of each of the six helicopters are in their stowed positions when the six helicopters are simultaneously housed within the parallelepiped region.

U.S. Pat. No. 6,824,151 (Tucei, Jr.) discloses a fixture for transporting helicopter blades. A fixture preferably includes a base, at least two retaining plates, and at least four casters. The base preferably includes two side members, two end members, and at least one cross member. Each retaining plate preferably includes at least one stabilator slot, at least four rotor blade slots, and at least two tail rotor blade slots. Each slot preferably includes a flange member which extends beyond the thickness of the retaining member. A nonabrasive material or nonabrasive coating is applied to an inside surface of each flange member to prevent damage to the helicopter blades.

As will be seen in the subsequent description of the preferred embodiments of the present invention, the present invention overcomes shortcomings of prior art.

Accordingly, there is a clearly felt need in the art for a design and system for transporting helicopter blades or other airfoils safely and securely. This invention enables helicopter blades to be transported safely whether they are removed and stored or remain attached to the aircraft. It is especially useful in a hostile or training environment to be able to have blades remain intact while aircraft is recovered and transported. It is also desirable in many maintenance arenas as removal of blades require considerable time and specialized personnel for handling. Recalibration is required if airfoils are removed and is very time and labor intensive.

A further object is to provide a means for conveniently supporting the transporting of helicopter blades into storage until blades are needed for reassembly.

Other objects, advantages and novel features of the invention will become apparent to those skilled in the art.

SUMMARY OF THE INVENTION

The blade support apparatus addresses these needs and objectives.

The blade support apparatus captures and stabilizes helicopter blades utilizing a support frame with vertically and radially adjustable supports. These supports have contoured padded cradles and a means of adjusting the height and angle of the cradles to match the profile being captured.

The present invention in the preferred embodiment is a blade support apparatus such as is usable for, but not restricted to, loading, transporting, and unloading helicopter blades comprises a container with pivoting supports having a platform, said supports including contoured resting pads and a means of adjusting the height and angle of the supports to match the contour of the blade being transported.

The container configuration enables conformity when the blades are removed from the helicopter and put into the blade box container. The root of the blade is secured by placing it onto the root plug and locking it down. The airfoil support pads are contoured pads and together with the pivoting support adjustable support form a blade cradle which is mounted into the box at varying points. The height and angle can be adjusted for each rotor blade, enabling them to conform to the blade curvature which spirals from the root to the tip if the blade. The need to handle a blade with pitch twisting from the root to the tip of the blade is apparent to those skilled in the art. Therefore, the ability of these cradles to adjust and conform to the varying curvature and pitch of an airfoil is vital to an understanding of this apparatus. You cannot simply lay the blades on a flat surface which creates point loads. The ability to conform to this spiraling range of motion distributes the load on the blades. This additionally results in a uniform weight distrubition on the pads and prevents point loads on the blades.

The combination of parts that form a pivoting airfoil support cradle vary slightly depending upon if the blades are to be transported and supported in the blade container box or remain attached to the helicopter and are transported and supported via the blade stanchions. In the case of the vertical blade stanchions, a spherical rod end enables the blade cradle to freely swivel and conform to the airfoil angle, thereby eliminating any stress that the support cradle would otherwise induce into the blade.

Either embodiment must fix firmly to the aircraft transporter. A container support, stabilizing block, and stabilizer cap may be utilized for securely connecting the assembly to a helicopter transport apparatus as depicted in U.S. Pat. No. 9,403,559 (Hadley et al.) or U.S. Pat. No. 9,718,390 (Hadley et al.). The blade stanchions or blade container may be secured by traditional methods such as welding or bolt-ons but must be stabilized.

For purposes of clarity in illustration the aircraft body itself is not shown in FIGS. 7A-14. However, it is understood by those skilled in the art that the air frame may or may not remain attached to the rotor and blades for the second, third and fourth preferred embodiments of the invention.

For a complete understanding of the blade support apparatus of the present invention, reference is made to the following detailed description and accompanying drawings in which the presently preferred embodiments of the invention are shown by way of example. As the invention may be embodied in many forms without departing from the spirit or essential characteristics thereof, it is expressly understood that the drawings are for purposes of illustration and description only and are not intended as a definition of the limits of the invention.

BRIEF DESCRIPTION OF THE DRAWINGS

FIG. 4A depicts an exploded view of container cradle assembly with airfoil support pads installed.

FIG. 4B depicts an exploded view of container cradle assembly with airfoil support pads installed and pivoted.

FIG. 5 depicts a trail transporting the blade support apparatus of FIG. 1.

FIG. 6 depicts an exploded view of the stabilizer assembly for the blade support apparatus of FIG. 1.

DESCRIPTION OF THE PREFERRED EMBODIMENTS

Figure 1:
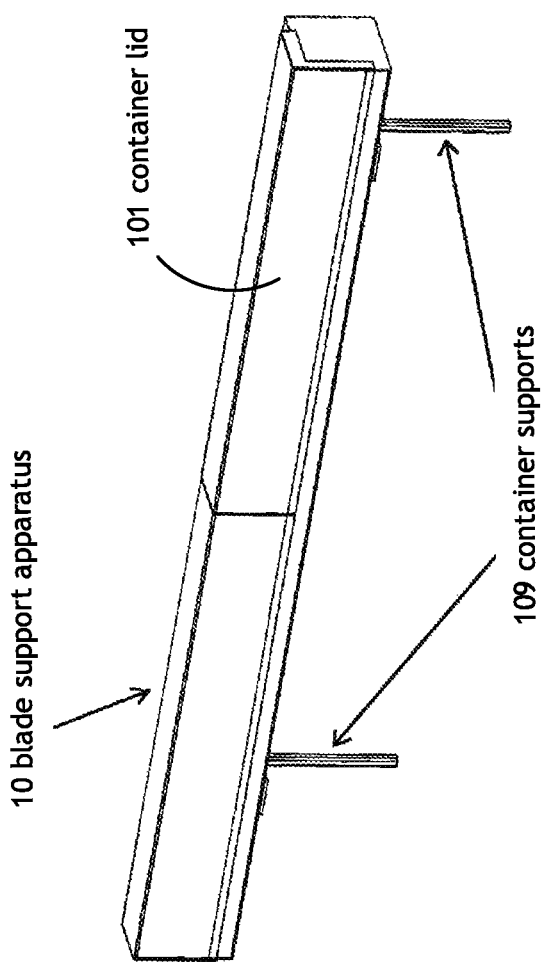
FIG. 1 depicts a first preferred embodiment of the blade support apparatus of the present invention for capturing and stabilizing airfoils such as helicopter blades to enable ground transport of the helicopter blades aircraft in a protective container with the container lid closed.
Figure 2A:
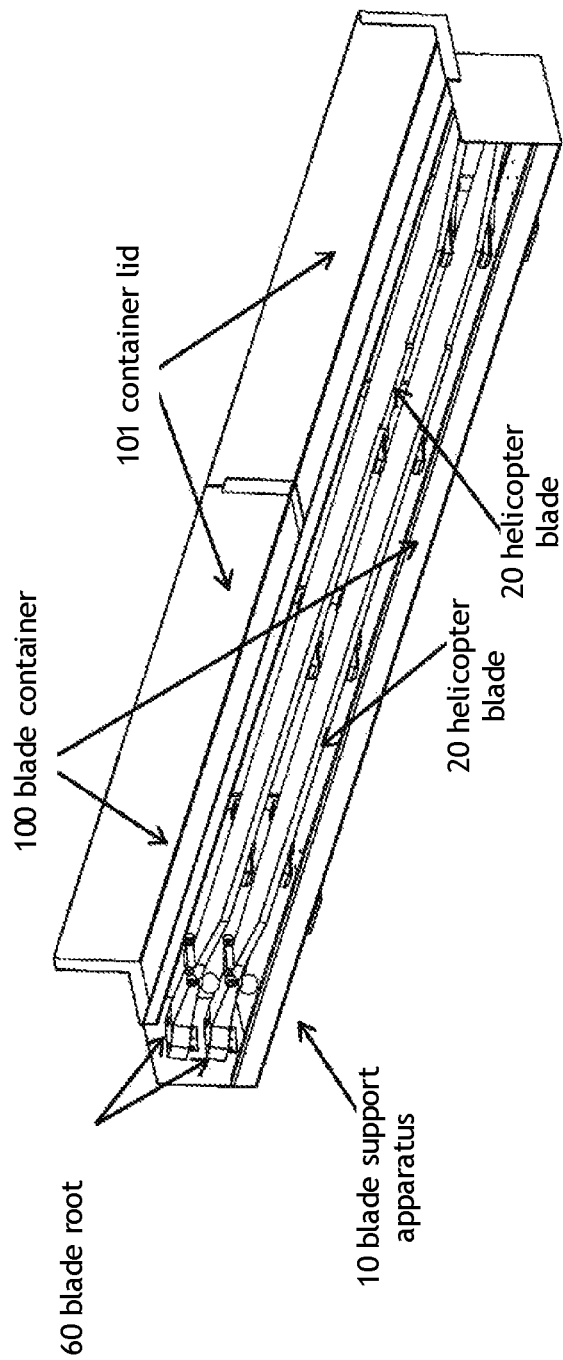
FIG. 2A depicts the blade support apparatus of FIG. 1 with the blades in position in the protective container.
Figure 2B:
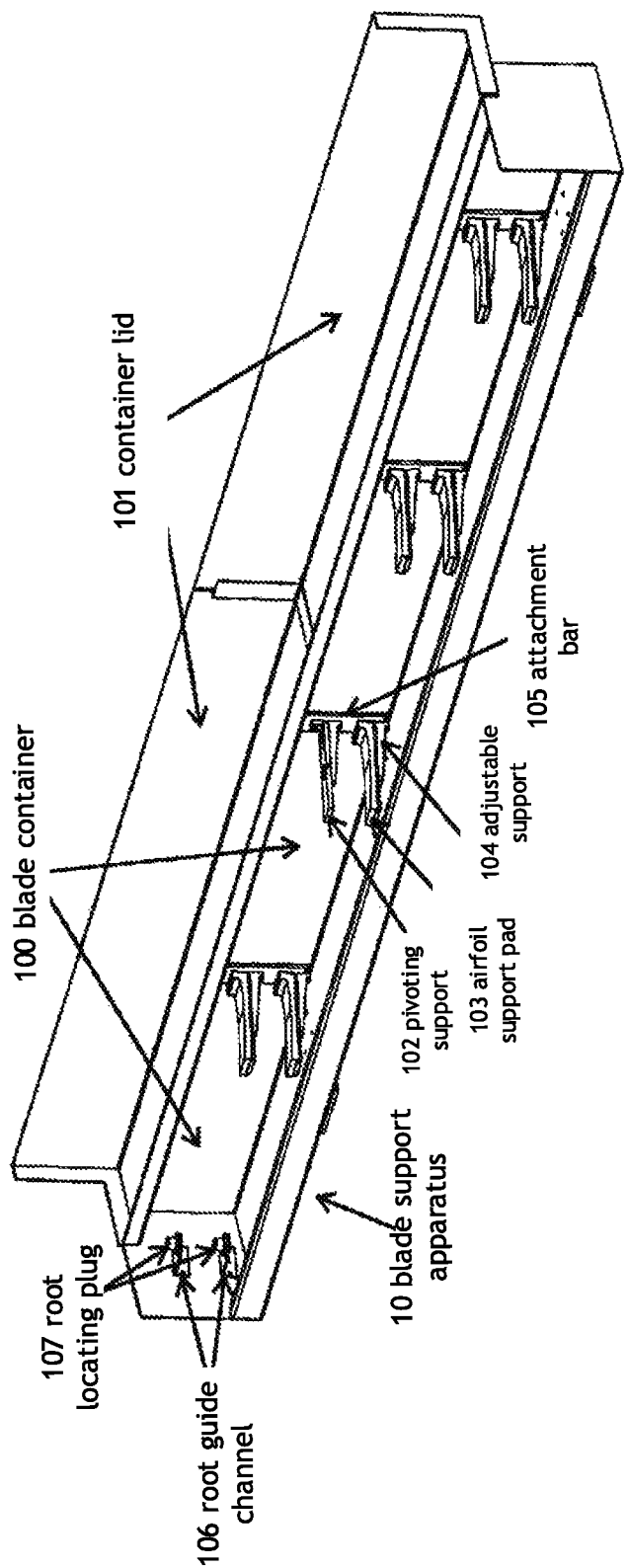
FIG. 2B depicts the blade support apparatus of FIG. 1 with the blades removed from the protective container.
Figure 3:
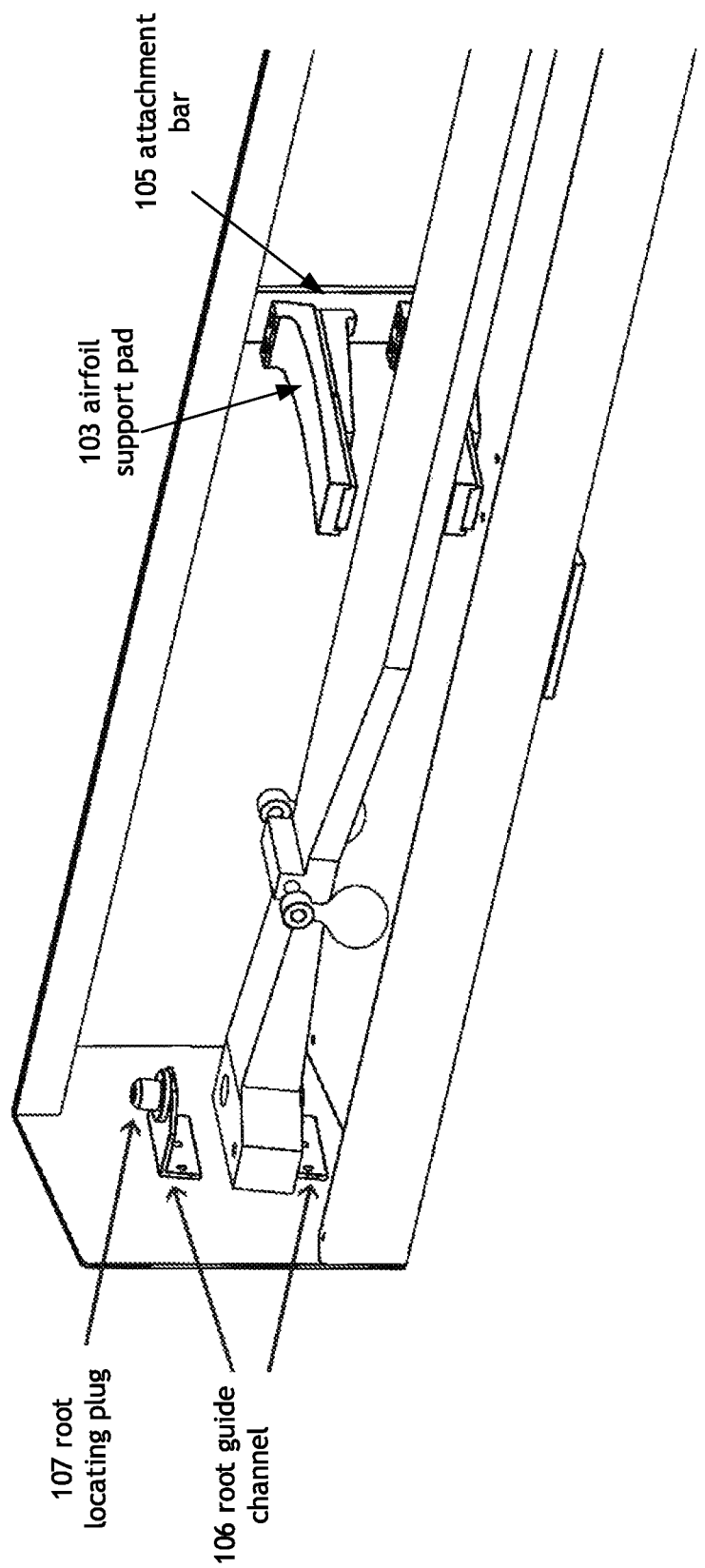
FIG. 3 depicts an exploded view of details from FIGS. 2A and 2B.
Figures 4C, 4D:
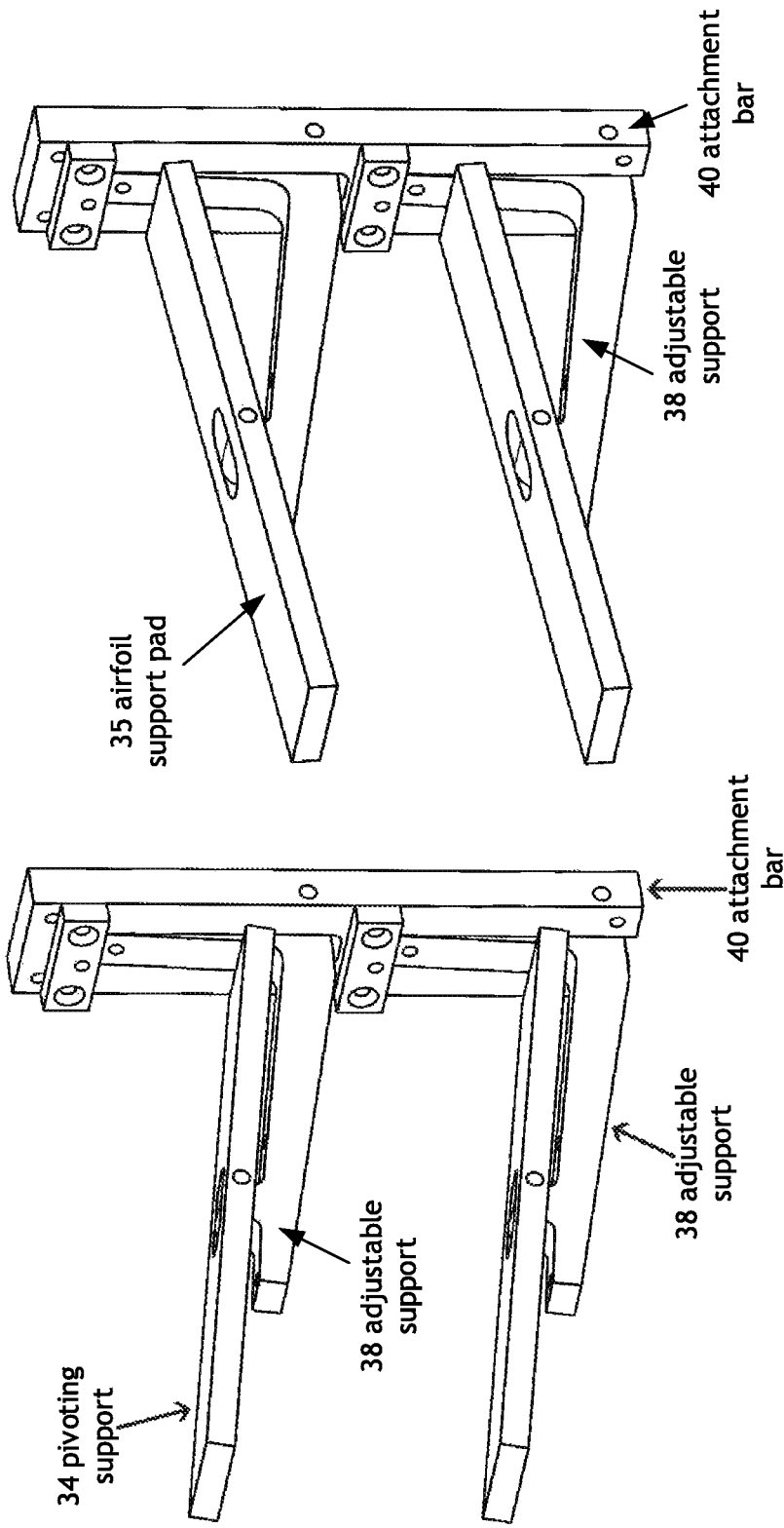
FIG. 4C depicts an exploded view of container cradle assembly without airfoil support pads.
FIG. 4D depicts an exploded view of container cradle assembly without airfoil support pads and partially pivoted.

Referring now to the drawings, FIGS. 1 through 6 depict a first preferred embodiment of the blade support apparatus 10 of the present invention, which comprises a blade box 100, box lids 101, pivoting supports 102, airfoil support pad 103, adjustable supports 104, container cradle mounts 105, root guide channels 106, root locating plugs 107, root containment screws (not shown), container supports 109, stabilizing blocks 110, and stabilizer caps 111.

The pivoting supports 102 with airfoil support pads 103 along with root guide channel 106 serve to form a plane on which to support the helicopter blades 20.

The blade box 100 serves to house two helicopter blades 20 and protect the blades from the outside environment.

Referring now to FIGS. 4A, 4B, 4C, and 4D, the adjustable supports 104 bolt to slots on container cradle mounts 105, enable height adjustment with fasteners. The pivoting supports 102 pivots on the adjustable supports 104, enabling angular adjustment relative to the attachment bar 105. In addition, slots in the pivoting support 102 enable position adjustment of the airfoil support pads 103.

The root guide channel 106 and root locating plug 107 serve to locate and support the blade root 201. The root containment screw (not shown) secures the root in place on the root guide channel 106.

The vertical support bars are compatible with and preferably attach to a helicopter transport apparatus as depicted in U.S. Pat. No. 9,403,559 (Hadley et al.) or U.S. Pat. No. 9,718,390 (Hadley et al.) using the stabilizing blocks, stabilizer pins (not shown), stabilizer caps, and stabilizer bolts (not shown) (see FIGS. 5, 6A, 6B, and 6C).

In operation, the blade support apparatus 10 is loaded onto a helicopter transport apparatus via blade stanchions, or by placing the container supports 109 in the stabilizer receivers 115 on the apparatus and securing them with stabilizing blocks 110 and stabilizer pins 112. The stabilizer caps 111 are then bolted into the stabilizing blocks 110 from the bottom of the container support 109 to secure the blade support apparatus 10 tightly to the stabilizer receivers 115. The blade support apparatus 10 of the present invention may also be utilized without the container supports 109 but must be secured such that the blade support apparatus is firmly secured to the frame. Other examples would include but are not limited to welding the supports directly to the transport trailer or bolting them to the transport trailer.

The stabilizing wedge block 110 is a wedge. When the bottom bolt 113 is tightened it draws the stabilizing wedge block 110 down. This forces the support bars 109 or 301 against the inside of the receiver 115. This drives a wedge between the stabilizer pin 112 and support bar 109 or 301. Key benefit of this stabilizing apparatus is that it allows easy installation and removal of support bars 301 or 109. Simply snug in the stabilizing wedge block to install and loosen up stabilizing wedge block 110 to remove. The wedge is at a shallow angle and little force is required to ensure a tight secure fit. It is self-locking and cannot be back-driven.

The helicopter blades 20 are then placed in the open container 100. The first blade 20 is disposed in the lower position. The root locating plug 107 is placed in the blade root 201 with flange on the bottom. The root 201 is then guided onto the root guide channel 106 while the blade is carefully placed on airfoil support pads 103 along the same plane. Once the blade is properly seated on all support pads 103 the root containment screw 108 is installed to keep the root in place. Next, the blade holds down straps (not shown) are secured to keep the blade in contact with the airfoil support pads 103 and hold the blade 20 in place.

Initial adjustment of the angle, height, and position of each support point is required prior to utilizing the blade support apparatus 10. Adjustable support 104 pivots to enable vertical adjustment and pivoting support 102 tilts to enable angular change. Both adjustments are secured with set screws in this preferred embodiment. In addition, airfoil support pad 103 is attached to slots on pivoting support 102, enabling for lateral movement of the pad 103. These features provide a safe, snug custom fit for specific airfoil profiles as varying airfoils have varying tilts and contours. The contour pad 103 can be easily swapped out and remolded or reformed for varying airfoil requirements. The design is highly and easily adjustable for varying airfoils.

Once the first blade 20 is secured in the lower position, the second blade 20 is loaded using the same procedure. When both the first and second blades 20 are loaded and secured, the container 100 is closed and secured.

As shown, the blade support apparatus 10 of the present invention is made from aluminum and a soft moldable urethane. It will also be understood that the blade support apparatus 10 of the present invention and the components can be made from other suitable materials.

Figure 7A:
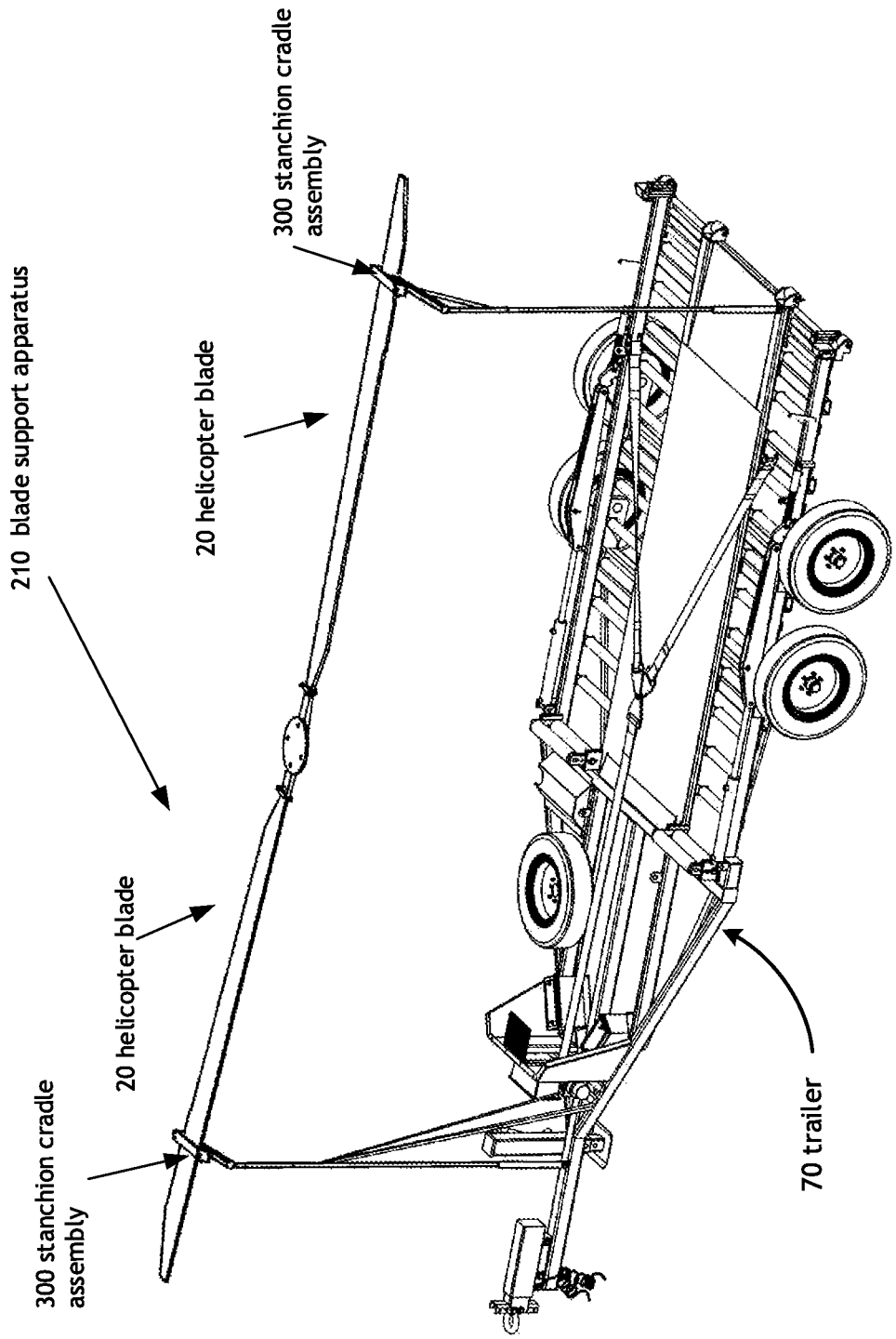
FIG. 7A depicts an assembly view of a second preferred embodiment of the blade support apparatus of the present invention with two blades shown secured in position.

FIG. 7A depicts an assembly view of a second preferred embodiment of the blade support apparatus of the present invention with two blades shown secured in position.

FIG. 7A depicts an assembly view of a second preferred embodiment of the blade support apparatus of the present invention with the blades shown remaining installed on the helicopter and/or folded in transport position.

Figure 7B:
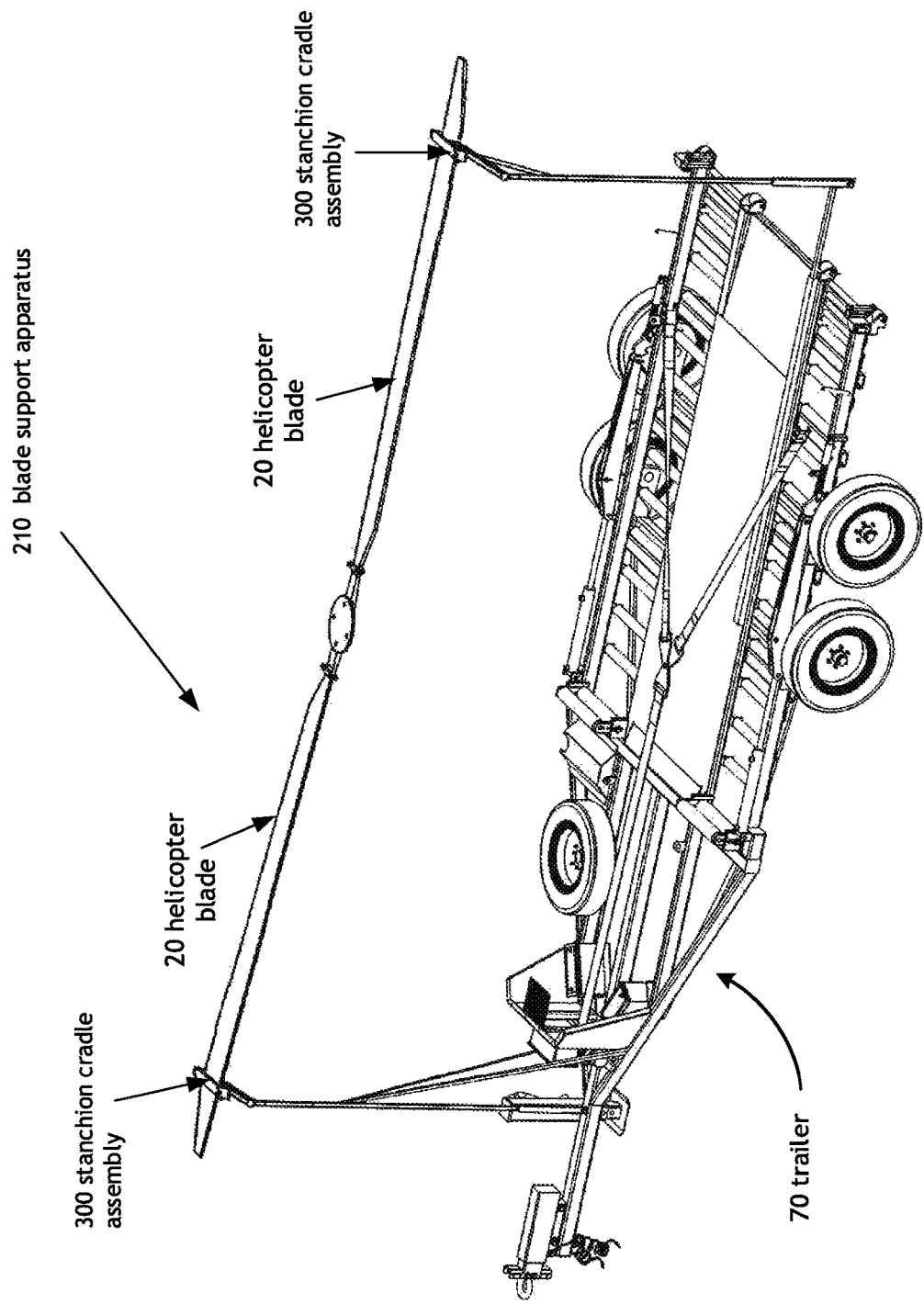
FIG. 7B depicts an assembly view of a third preferred embodiment of the blade support apparatus of the present invention with two blades requiring extension arms to properly center longer blades.
Figure 8:
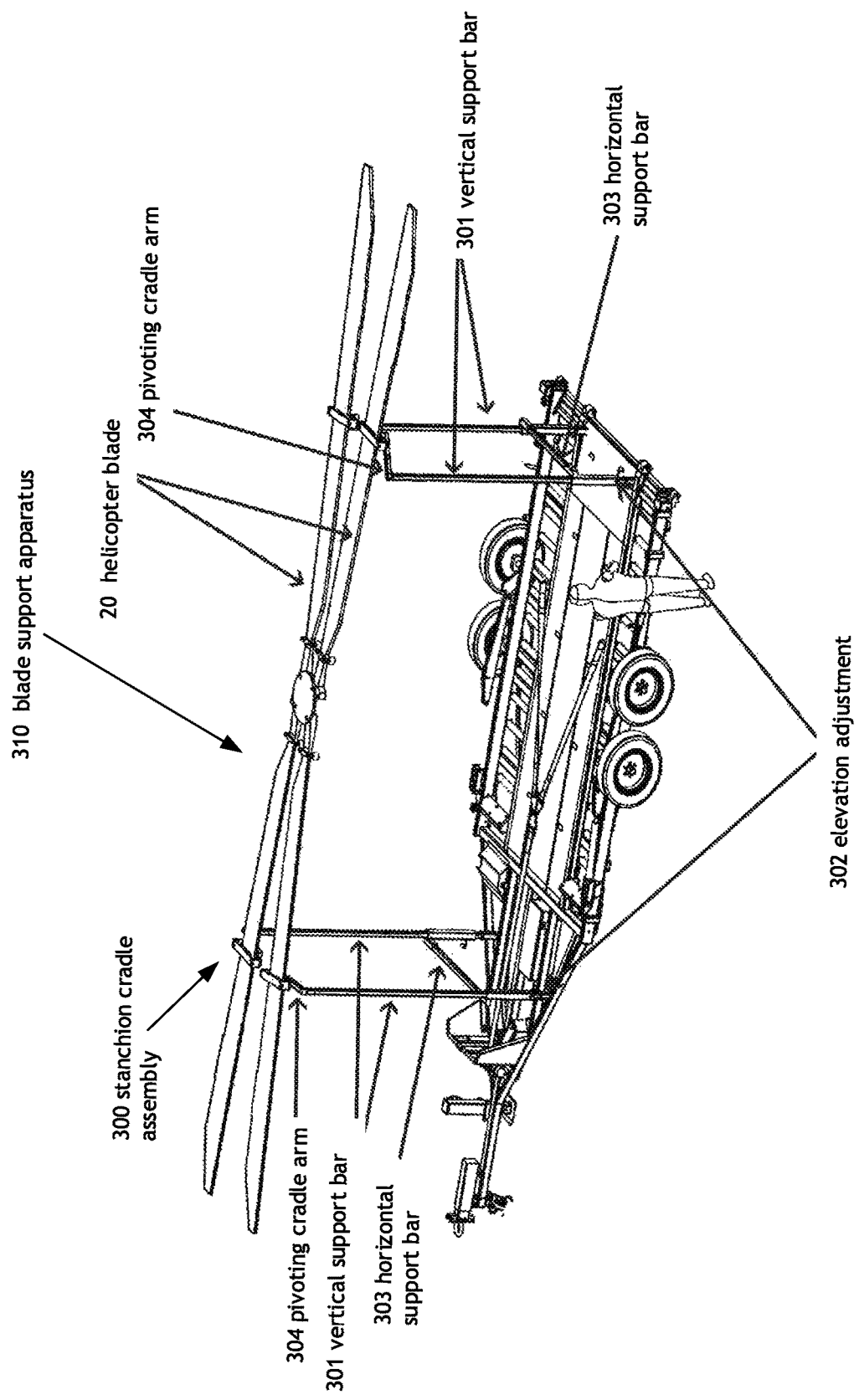
FIG. 8 depicts an assembly view of a fourth preferred embodiment of the blade support apparatus of the present invention with four blades shown secured in position.
Figure 9:
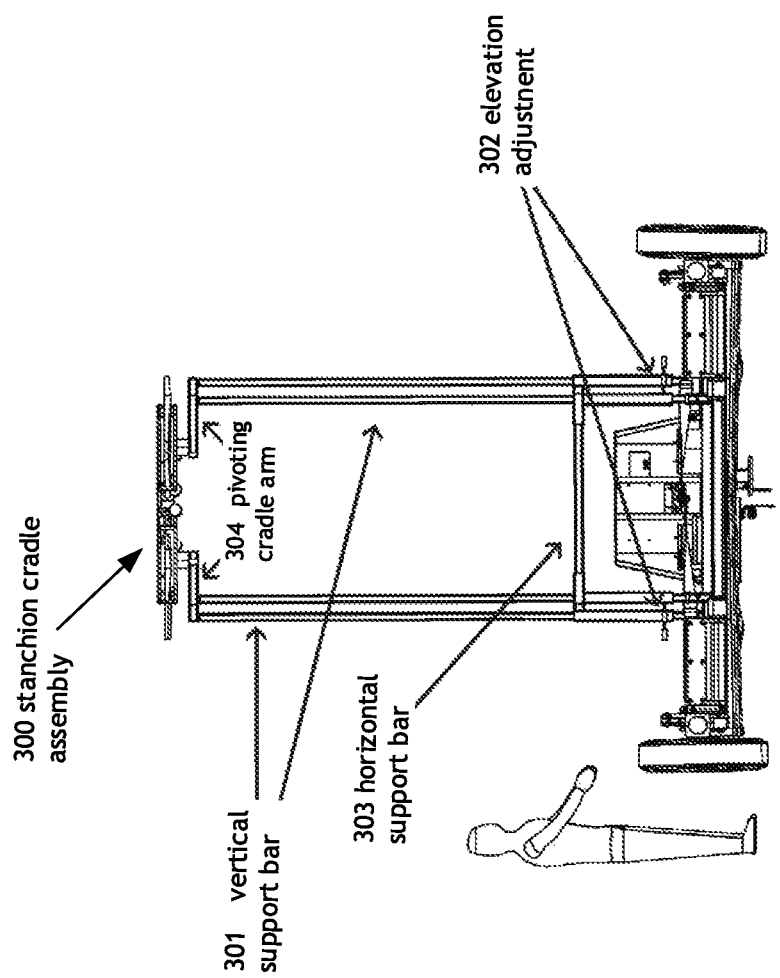
FIG. 9 depicts a rear view of the blade support apparatus of FIG. 8 with the blades shown in position.

FIG. 7B depicts an assembly view of a third preferred embodiment of the blade support apparatus of the present invention with two blades requiring extension arms to properly center longer blades. FIG. 7B depicts an assembly view of a third preferred embodiment of the blade support apparatus of the present invention 210 with the blades shown remaining installed on the helicopter and/or folded in transport position.

Referring now to FIGS. 8 through 14, which depict a fourth preferred embodiment of the blade support apparatus 310 of the present invention. The blade support apparatus 310 comprises vertical support bars 301, elevation adjustment 302, horizontal support bars 303, pivoting cradle arms 304, blade cradle assembly 300s, airfoil support pads 103, airfoil containment clamp 305, airfoil containment pads 306, stabilizing blocks 110, and stabilizer caps 111. The view depicted shows the blade cradles being secured in place via a hinged clamp comprised of a containment bar 305 and an airfoil containment pad 306. This could be secured in many ways, including a strap around the loaded assembly. The strap is not restricted to any particular material.

Figure 10:
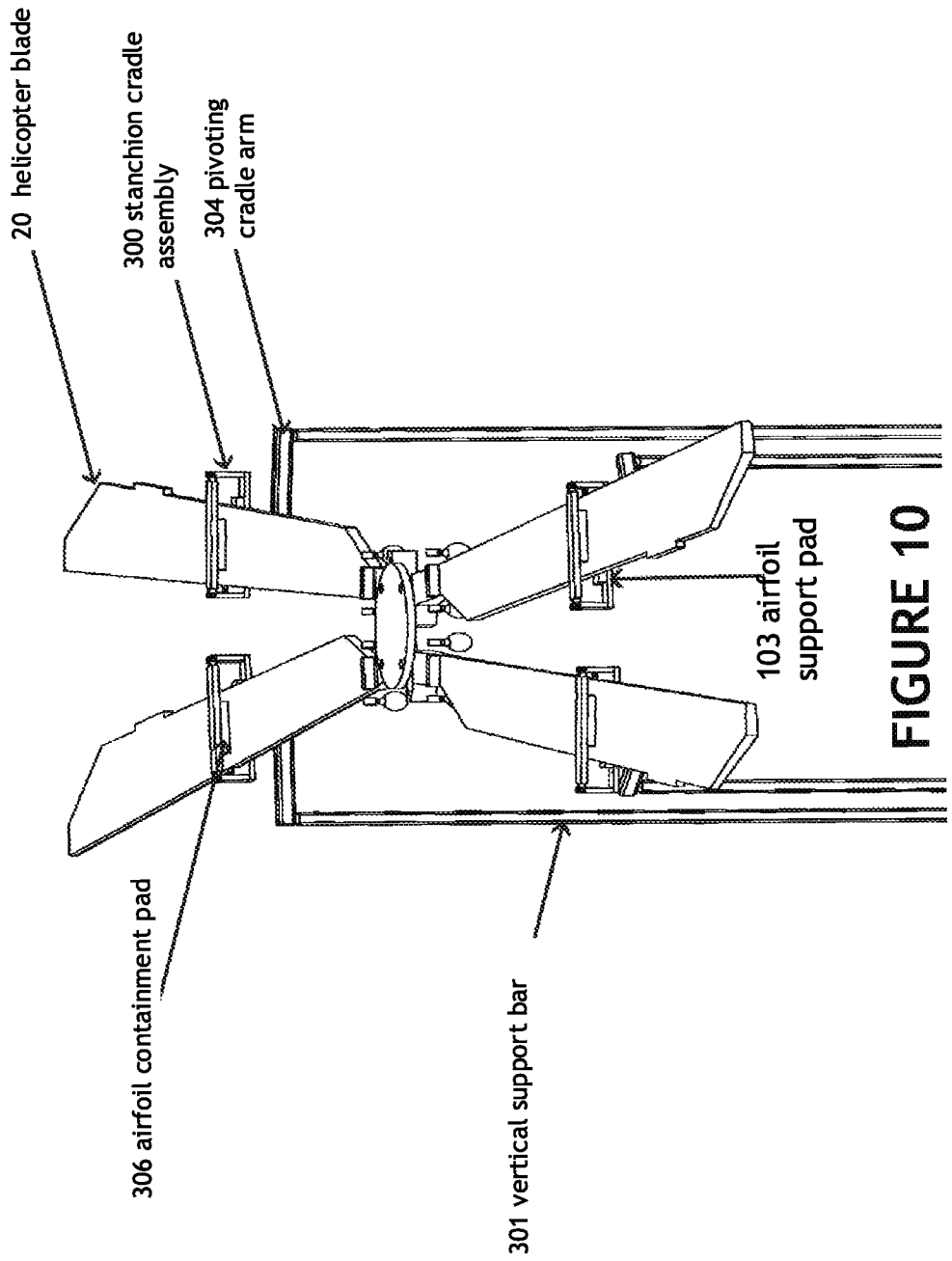
FIG. 10 depicts a detailed view of the captured helicopter blades being supported by the blade support apparatus of FIG. 8.

Referring now to FIG. 10, the stanchion cradle assemblies 300 with internal blade swivel cradles 103 serve to form a plane on which to support the helicopter blades. Enabling for safe and secure highway transport of blades without removing them from the helicopter is a great benefit over prior art.

Figure 11:
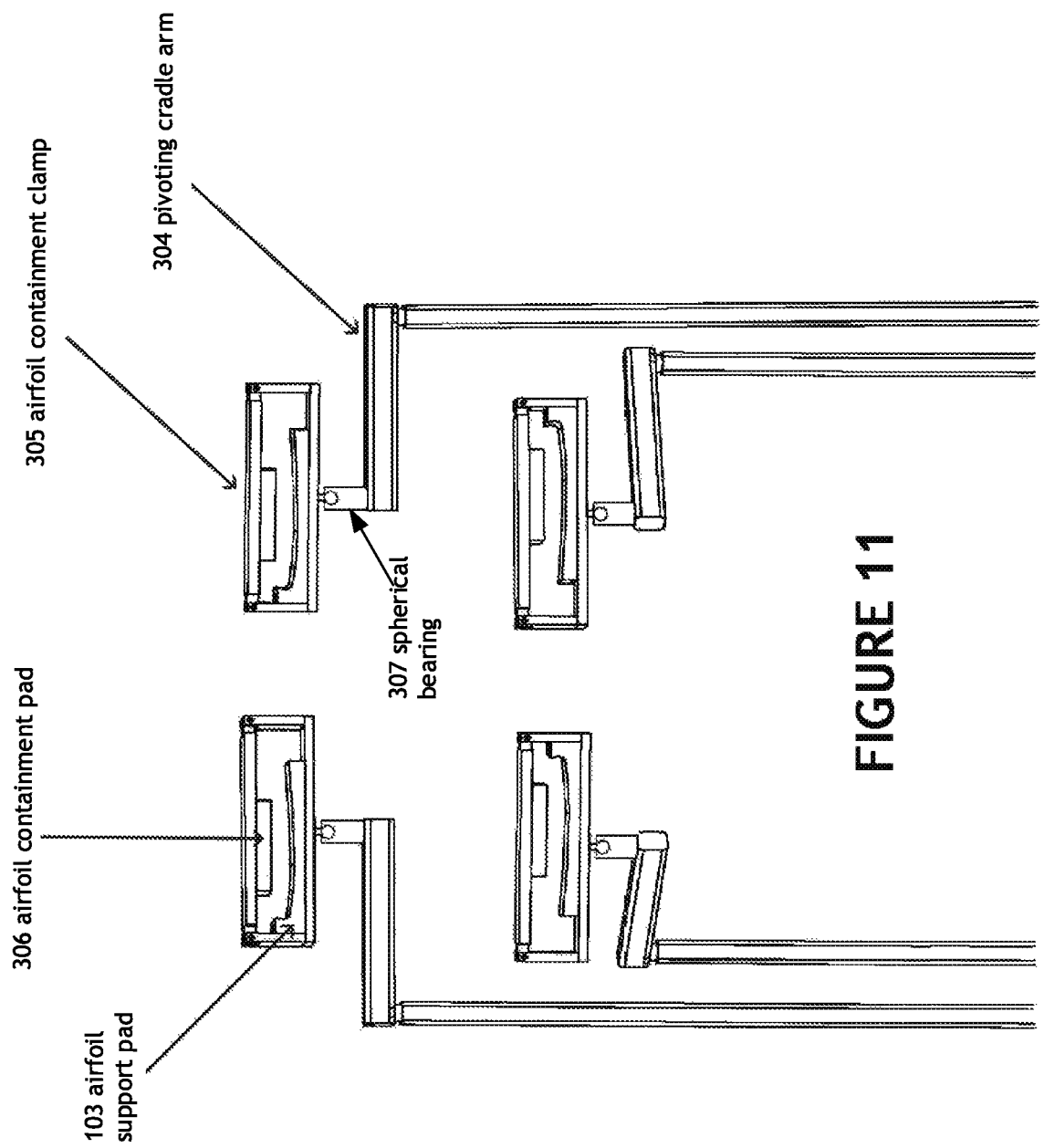
FIG. 11 depicts an exploded view of the four pivoting cradle arms along with blade swivel cradles of FIG. 8.
Figure 12:
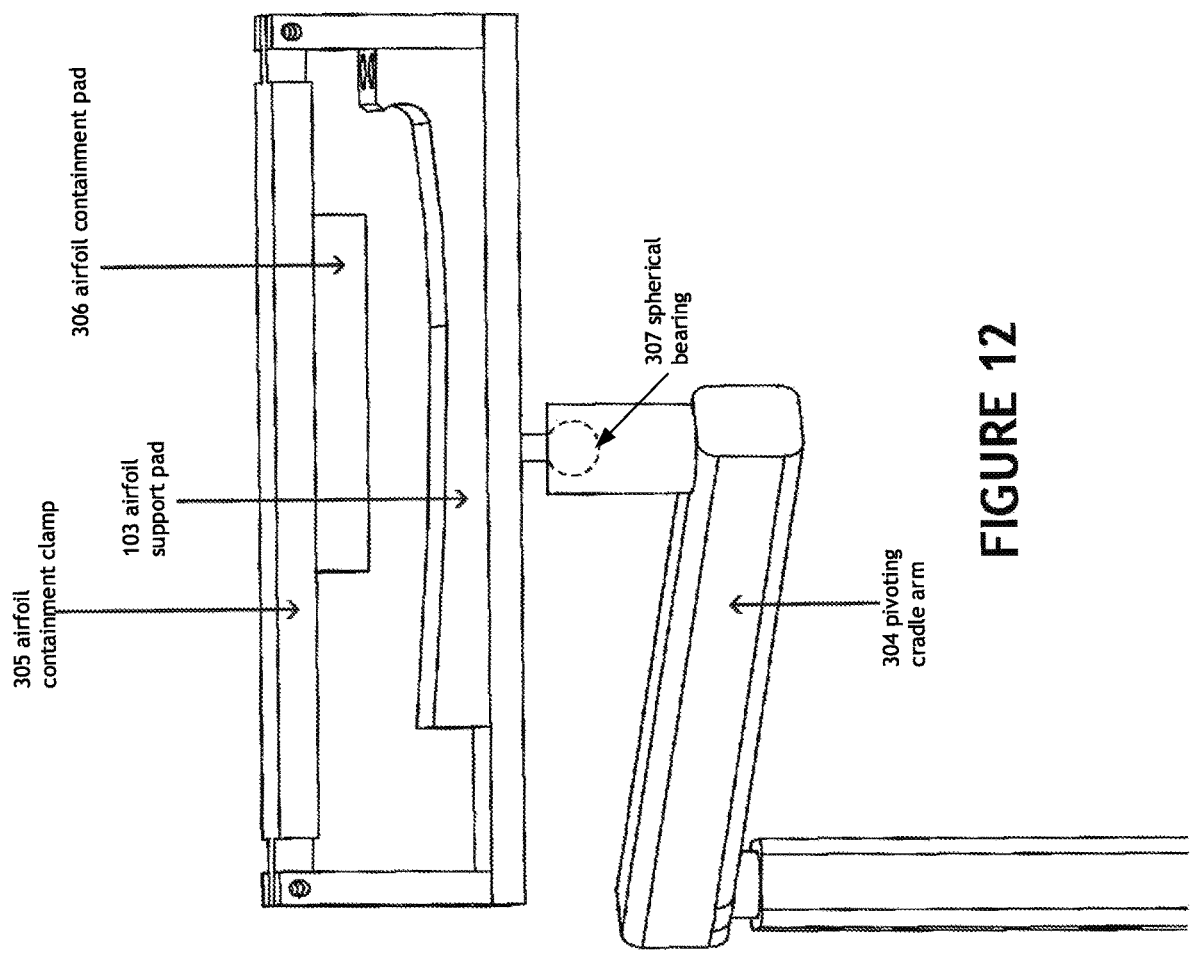
FIG. 12 is a detailed view of a blade cradle installed of blade stanchions of the blade support apparatus of FIG. 8.
Figure 13:
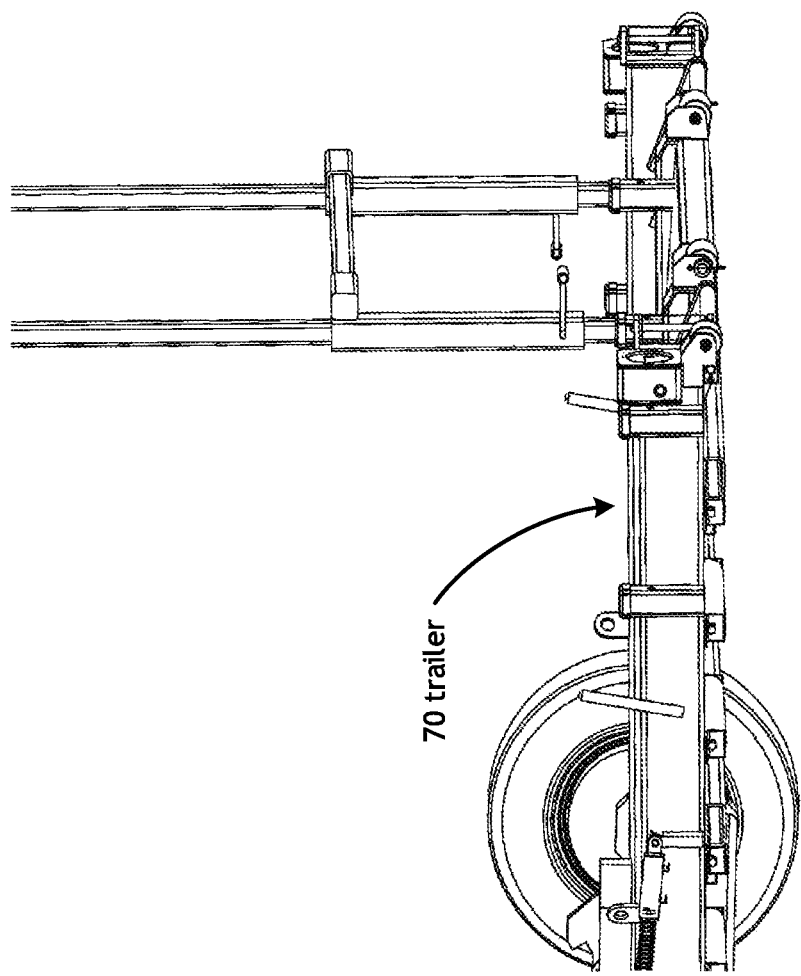
FIG. 13 depicts an exploded view of the elevational adjustment of a transport wheel of FIG. 9.
Figure 14:
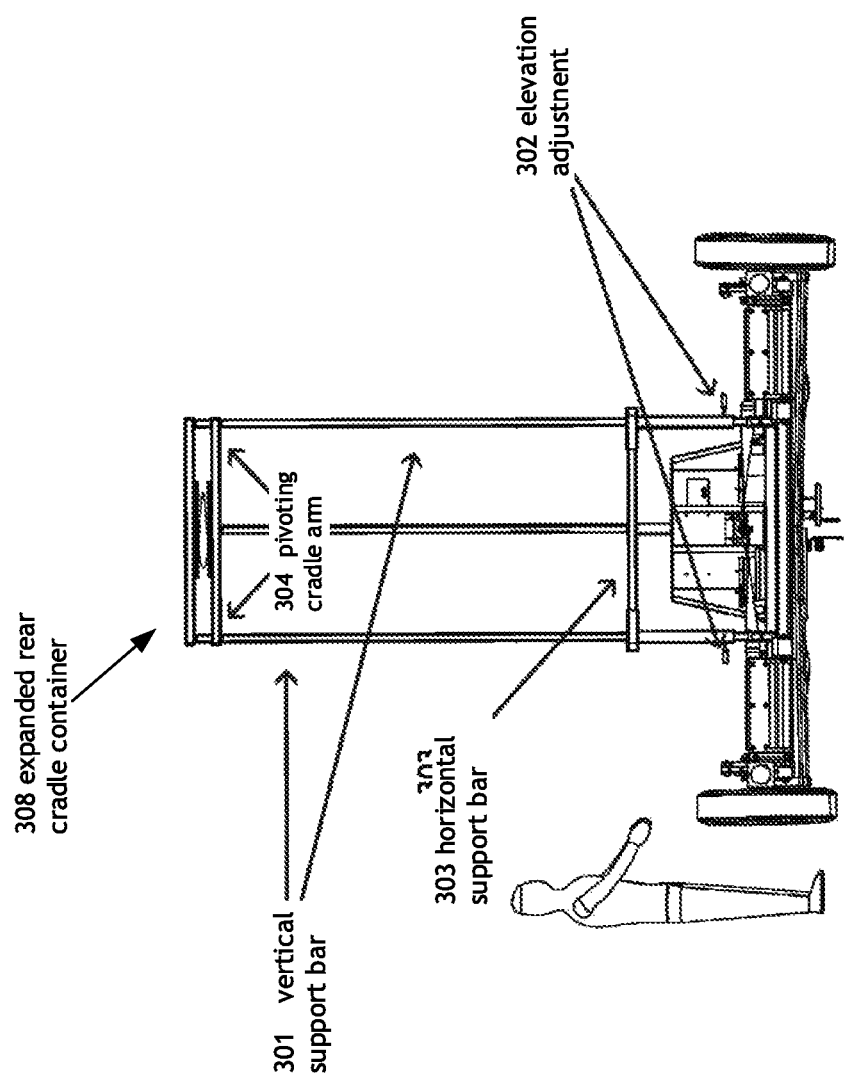
FIG. 14 depicts a rear view of another blade support apparatus of FIG. 8 with an extended width cradle.

As shown in FIGS. 11 and 12, the blade swivel cradle assemblies 300 secure the blades 20 by resting them on airfoil support pads 103 and capturing them with airfoil containment clamp 305 and airfoil containment pads 306. The cradles are fully adjustable. This securing method is not intended as a sole solution. Many securing methods would be applicable, including a simple strap.

In operation, the blade support apparatus 30 of the present invention is installed onto a helicopter transport apparatus by placing the vertical support bars 301 in the stabilizer receivers 115 on the apparatus and securing them with stabilizing wedge blocks 110 and stabilizer pins 112. The stabilizer caps 111 are then bolted into the stabilizing wedge blocks 110 from the bottom of the vertical support bar 301 to secure the blade support apparatus 30 of the present invention tightly to the stabilizer receivers 115. This rigid fitment assures that the blades receive the benefit of the suspension provided by the helicopter transfer apparatus. This method is but one means of securing the blade support apparatus 30 to a transport apparatus. There are many other methods which will work.

Vertical support bars 301 are then adjusted to the appropriate height using the elevation adjustment 302 feature on the vertical support bar 301. Blades 20 remain attached and must be folded to position two forward and two rearward. Front blades 20 should be positioned first. Adjust the elevation of the blade swivel cradles to make the blade 20 parallel to the ground. Airfoil containment pads 306 should be removed from blade swivel cradles during height adjustment so the blades 20 can rest properly in the airfoil support pads 103. Blade swivel cradles must be guided into proper position to support each blade 20 on its airfoil support pad 103. The blade cradle assemblies 300 are ball mounted 307 so they can move freely in three dimensions, and the airfoil support pads 103 are specifically contoured to each blade 20 to provide the perfect resting position. The spherical rod end or spherical bearing 307 allows the airfoil stanchion cradle assembly 300 to freely swivel. This enables the cradle to conform to the airfoil angle of pitch and together with the contoured airfoil support pad 103 eliminates inductive stresses that would otherwise be induced into the airfoil. Once the blade 20 is parallel and properly seated in the cradle, airfoil containment pads 306 are secured using hardware provided or an alternate strap may be used for securing blade into cradle for safe secure transport. The spherical bearing or ball joint or spherical rod end are examples of varying means of achieving desired swivel. The same procedure is then repeated for the rear blades 20. After all blades are secured, insure they are flat and level with the ground. Make any required adjustments to eliminate blade flex and double check the load for security.

Although the description of the blade support apparatus of the present invention above includes many specificities, these should not be construed as limiting the scope of the invention but as merely providing illustrations of some of the presently preferred embodiments of this invention.

It is evident that many alternatives, modifications, and variations of the blade support apparatus of the present invention will be apparent to those skilled in the art in lieu of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

Throughout this application, various Patents are referenced by number and inventor. The disclosures of these documents in their entireties are hereby incorporated by reference into this specification in order to more fully describe the state of the art to which this invention pertains. It is evident that many alternatives, modifications, and variations of the cantilevered watercraft canopy system of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

The invention claimed is:

1. A blade support apparatus for use with a transport vehicle to transport a first and second blade of a helicopter along with said helicopter, said blade support apparatus including:
   a first stanchion cradle assembly enabling adjustment to a first height and angle of
   a first blade profile for said first blade, said first stanchion cradle assembly having;
      a first airfoil containment clamp having a first airfoil containment pad on a first upper surface and a first airfoil support pad on a lower surface, said first blade being securely retained within said first airfoil containment clamp between said first airfoil containment pad and said first airfoil support pad;
      a first pivoting cradle arm secured to a first support bar; and
      a first ball-mounted engagement between said first pivoting cradle arm and said first airfoil engagement clamp, said first ball-mounted engagement enabling highway transport of said first blade without removing said first blade from said helicopter; and
   a second stanchion cradle assembly enabling adjustment to a first height and angle of a first blade profile for said second blade, said second stanchion cradle assembly having;
      a second airfoil containment clamp having a second airfoil containment pad on a second upper surface and a second airfoil support pad on a lower surface, said second blade being securely retained within said second airfoil containment clamp between said second airfoil containment pad and said second airfoil support pad;
      a second pivoting cradle arm secured to a second support bar; and
      a second ball-mounted engagement between said second pivoting cradle arm and said second airfoil engagement clamp, said second ball-mounted engagement enabling highway transport of said second blade without removing said second blade from said helicopter.

2. The blade support assembly of claim 1, wherein once said first blade is seated in said first stanchion cradle assembly, said first blade is secured between said first airfoil containment pad and said first airfoil support pad.

3. The blade support assembly of claim 1, wherein said first ball-mounted engagement together with said first pivoting cradle arm enables said first stanchion cradle assembly to conform to a blade angle of pitch eliminating inductive stresses induced in said first blade.

4. The blade support assembly of claim 1, wherein said first stanchion cradle assembly which includes said first airfoil support pad forms a plane to support said first blade.

5. The blade support assembly of claim 1, wherein said first stanchion cradle assembly is adjustable.

6. The blade support assembly of claim 1, wherein said first and second support bars comprising a first plurality of support bars, said first plurality of support bars supporting said first stanchion cradle assembly.

7. The blade support assembly of claim 1, wherein said blade support apparatus being configured for transporting a third and fourth blade of said helicopter, and further comprising:
   a third stanchion cradle assembly enabling adjustment to a first height and angle of a first blade profile for said third blade, said third stanchion cradle assembly having;
      a third airfoil containment clamp having a third airfoil containment pad on a third upper surface and a third airfoil support pad on a lower surface, said third blade being securely retained within said third airfoil containment clamp between said third airfoil containment pad and said third airfoil support pad;
      a third pivoting cradle arm secured to a third support bar; and
      a third ball-mounted engagement between said third pivoting cradle arm and said third airfoil engagement clamp, said third ball-mounted engagement enabling highway transport of said third blade without removing said third blade from said helicopter; and
   a fourth stanchion cradle assembly enabling adjustment to a first height and angle of a first blade profile for said fourth blade, said fourth stanchion cradle assembly having;
      a fourth airfoil containment clamp having a fourth airfoil containment pad on a fourth upper surface and a fourth airfoil support pad on a lower surface, said fourth blade being securely retained within said fourth airfoil containment clamp between said fourth airfoil containment pad and said fourth airfoil support pad;
      a fourth pivoting cradle arm secured to a fourth support bar; and
      a fourth ball-mounted engagement between said fourth pivoting cradle arm and said fourth airfoil engagement clamp, said fourth ball-mounted engagement enabling highway transport of said fourth blade without removing said fourth blade from said helicopter.

8. A blade support apparatus for use with a transport vehicle to transport a first blade of a helicopter along with said helicopter, said blade support apparatus including:
a first stanchion cradle assembly enabling adjustment to a first height and angle of
a first blade profile for said first blade, said first stanchion cradle assembly having:
a first airfoil containment clamp having a first airfoil containment pad on a first upper surface and a first airfoil support pad on a lower surface, said first blade being securely retained within said first airfoil containment clamp between said first airfoil containment pad and said first airfoil support pad;
a first pivoting cradle arm secured to a first support bar; and
a first ball-mounted engagement between said first pivoting cradle arm and said first airfoil engagement clamp, said first ball-mounted engagement enabling highway transport of said first blade without removing said first blade from said helicopter.

9. A vehicle including a platform for transporting a helicopter with a helicopter rotor and a first and second blade assembled on said helicopter, the vehicle including a blade support apparatus, said blade support apparatus including:
a first stanchion cradle assembly enabling adjustment to a first height and angle of
a first blade profile for said first blade, said first stanchion cradle assembly having;
a first airfoil containment clamp having a first airfoil containment pad on a first upper surface and a first airfoil support pad on a lower surface, said first blade being securely retained within said first airfoil containment clamp between said first airfoil containment pad and said first airfoil support pad;
a first pivoting cradle arm secured to a first support bar; and
a first ball-mounted engagement between said first pivoting cradle arm and said first airfoil engagement clamp, said first ball-mounted engagement enabling said vehicle to transport said first blade without removing said first blade from said helicopter; and
a second stanchion cradle assembly enabling adjustment to a first height and angle of a first blade profile for said second blade, said second stanchion cradle assembly having;
a second airfoil containment clamp having a second airfoil containment pad on a second upper surface and a second airfoil support pad on a lower surface, said second blade being securely retained within said second airfoil containment clamp between said second airfoil containment pad and said second airfoil support pad;
a second pivoting cradle arm secured to a second support bar; and a second ball-mounted engagement between said second pivoting cradle arm and said second airfoil engagement clamp, said second ball-mounted engagement enabling said vehicle to transport said second blade without removing said second blade from said helicopter.

10. The vehicle of claim 9, wherein once said first blade is seated in said first stanchion cradle assembly, said first blade is secured between said first airfoil containment pad and said first airfoil support pad.

11. The vehicle of claim 9, wherein said first ball-mounted engagement together with said first pivoting cradle arm enables said stanchion cradle assembly to conform to a blade angle of a pitch eliminating inductive stresses induced in said first blade.

12. The vehicle of claim 9, wherein said blade support apparatus being for use with said vehicle for transporting a third and fourth blade of said helicopter and further comprising:
a third stanchion cradle assembly enabling adjustment to a first height and angle of
a first blade profile for said third blade, said third stanchion cradle assembly having;
a third airfoil containment clamp having a third airfoil containment pad on a third upper surface and a third airfoil support pad on a lower surface, said third blade being securely retained within said third airfoil containment clamp between said third airfoil containment pad and said third airfoil support pad;
a third pivoting cradle arm secured to a third support bar; and
a third ball-mounted engagement between said third pivoting cradle arm and said third airfoil engagement clamp, said third ball-mounted engagement enabling highway transport of said third blade without removing said third blade from said helicopter; and
a fourth stanchion cradle assembly enabling adjustment to a first height and angle of a first blade profile for said fourth blade, said fourth stanchion cradle assembly having;
a fourth airfoil containment clamp having a fourth airfoil containment pad on a fourth upper surface and a fourth airfoil support pad on a lower surface, said fourth blade being secureably retained within said fourth airfoil containment clamp between said fourth airfoil containment pad and said fourth airfoil support pad;
a fourth pivoting cradle arm secured to a fourth support bar; and
a fourth ball-mounted engagement between said fourth pivoting cradle arm and said fourth airfoil engagement clamp, said fourth ball-mounted engagement enabling highway transport of said fourth blade without removing said fourth blade from said helicopter.

* * * * *